United States Patent [19]

Guggisberg

[11] Patent Number: 5,025,822

[45] Date of Patent: Jun. 25, 1991

[54] WATER DISINFECTING SYSTEM

[76] Inventor: Steven J. Guggisberg, Box 171, Glenwood, Minn. 56334

[21] Appl. No.: 506,794

[22] Filed: Apr. 10, 1990

[51] Int. Cl.$^5$ .............................................. C02F 1/68
[52] U.S. Cl. .................................... 137/1; 137/888; 137/895; 210/170; 210/198.1; 210/747; 210/754
[58] Field of Search .......................... 137/1, 888, 895; 210/167, 170, 198.1, 747, 754

[56] References Cited

U.S. PATENT DOCUMENTS

| | | |
|---|---|---|
| 571,692 | 11/1896 | Schneible . |
| 1,514,939 | 11/1924 | Wallace . |
| 2,260,395 | 10/1941 | Mudge . |
| 2,337,921 | 12/1943 | Petroe . |
| 2,381,589 | 8/1945 | Hayes . |
| 2,690,717 | 10/1954 | Goodrie . |
| 3,326,747 | 6/1967 | Ryan et al. . |
| 3,481,529 | 12/1969 | Mugele . |
| 3,807,434 | 4/1974 | Rasmussen et al. . |
| 3,816,027 | 6/1974 | Miscovich . |
| 3,922,112 | 11/1975 | Miscovich . |
| 4,059,522 | 11/1977 | Polley et al. . |
| 4,181,469 | 1/1980 | Dion-Biro . |
| 4,234,425 | 11/1980 | Leo . |
| 4,332,529 | 6/1982 | Alperin . |
| 4,333,833 | 6/1982 | Longley ..................... 210/198.1 |
| 4,334,968 | 6/1982 | Sweeney . |
| 4,478,765 | 10/1984 | Tubbs ............................ 210/170 X |
| 4,662,538 | 5/1987 | Goudy, Jr. et al. . |

OTHER PUBLICATIONS

Lindsay Chemical Feed Pump Systems, The Lindsay Company, St. Paul, MN, Part No. 0601841 Rev. 3/84 JR.

*Primary Examiner*—Robert G. Nilson
*Attorney, Agent, or Firm*—Peterson, Wicks, Nemer & Kamrath

[57] ABSTRACT

A method and apparatus for delivering disinfectant in a liquid form to a well of a water system is disclosed including a venturi having a suction side in fluid communication with a source of disinfectant such as chlorine. A flow of water is provided through the venturi between the pressurized side of the water system and the well when a pump is drawing water from the well and delivering the water to the pressurized side of the water system. Specifically, a solenoid valve is provided in the lines between the pressurized side of the water system and the venturi and is electrically controlled by the pressure switch which also controls the pump. In the preferred form, a timer is provided electrically intermediate the solenoid valve and the pressure switch to allow water flow through the solenoid valve only during selected times of pump actuation to allow adjustment of the rate at which the disinfectant is delivered. To prevent freezing of the output line, a bypass line may be provided between the pressurized side of the water system and the output line bypassing the solenoid valve and the venturi and providing a continuous flow of water therethrough. In an alternate form, a heat tape for conducting heat to the output line may be provided as part of or within a conduit in which the output line is slideably received.

20 Claims, 1 Drawing Sheet

WATER DISINFECTING SYSTEM

BACKGROUND

The present invention generally relates to systems for disinfecting water, particularly to such systems for use with well water systems, and specifically to such systems for use in private well water systems for individual homes, farms, cottages, or the like.

The use of chlorine to disinfect water is well known. However, chlorination typically is utilized in larger water systems such as for delivering water to municipalities or the like. However, many locations do not have ready access to such municipal water systems and instead have their own private well water systems. Unfortunately, many such private wells are contaminated and water drawn from such wells should be disinfected prior to use.

Most chlorination systems presently in use such as in municipalities or the like are complex in nature and require a significant degree of surveillance and maintenance. Thus, such systems are too expensive and impractical for private, individual-type well water systems. Prior attempts to provide disinfectant to private, individual-type well water systems includes chemical feed pump systems which deliver disinfectant into the high pressure tank of the water system. However, as the disinfectant is supplied to the high pressure side of the system, such pumps are costly to manufacture and maintain. Further, due to the chemical nature of the disinfectant, such pumps were prone to problems resulting from clogged lines and from corrosion. Also, disinfectant was only supplied to the water supplied from the high pressure tank to which the feed pump was connected and not to water which was supplied from other locations in the water system. Another approach to providing disinfectant to private, individual-type well water systems was to dispense disinfectant tablets down the well utilizing a gumball-type dropping machine. However, such systems were undesirable as often the tablets landed on obstructions in the well casing such as the pitless adapter in submersible pump systems and did not reach the water in the well. Further, as the tablet dropping machine was mounted on the well itself, such machines were prone to frost build-up which clogged the tablet drop tube and/or which bound up the dispensing mechanism. Further, adjustment of the rate at which tablets were dispensed was extremely difficult and typically could not be performed by the well owners themselves, but required adjustment by skilled personnel.

Thus, a need exists for a system for disinfecting water for use in private well water systems which is not prone to corrosion and/or clogged lines, which supplies the disinfectant directly to the well, and which is easy to adjust the rate at which disinfectant is supplied.

SUMMARY

The present invention solves this need and other problems in supplying disinfectant to a well water system by providing, in the preferred form, an apparatus and method where a flow of water is provided from the pressurized side of the water system to the well when water is being drawn from the well and delivered to the pressurized side of the water system, with the flow of water passing through a venturi for drawing disinfectant from a source and mixing the disinfectant with the flow of water for passage therewith into the well.

It is thus an object of the present invention to provide a novel apparatus for delivering disinfectant in a liquid form to a well of a water system.

It is thus an object of the present invention to provide a novel method for delivering disinfectant in a liquid form to a well of a water system.

It is further an object of the present invention to provide such novel disinfectant delivery apparatus and method especially adapted for private well water systems.

It is further an object of the present invention to provide such novel disinfectant delivery apparatus and method which are not prone to corrosion problems.

It is further an object of the present invention to provide such novel disinfectant delivery apparatus and method which are not prone to clogging problems.

It is further an object of the present invention to provide such novel disinfectant delivery apparatus and method allowing ease of adjustment of disinfectant delivery rates.

It is further an object of the present invention to provide such novel disinfectant delivery apparatus and method which supply the disinfectant directly to the well in liquid form.

It is further an object of the present invention to provide such novel disinfectant delivery apparatus and method which are not prone to freezing.

It is further an object of the present invention to provide such novel disinfectant delivery apparatus and method of a simple design not prone to wear and breakdown.

These and further objects and advantages of the present invention will become clearer in light of the following detailed description of illustrative embodiments of this invention described in connection with the drawings.

DESCRIPTION OF THE DRAWINGS

The illustrative embodiments may best be described by reference to the accompanying drawings where.

Figure 1:
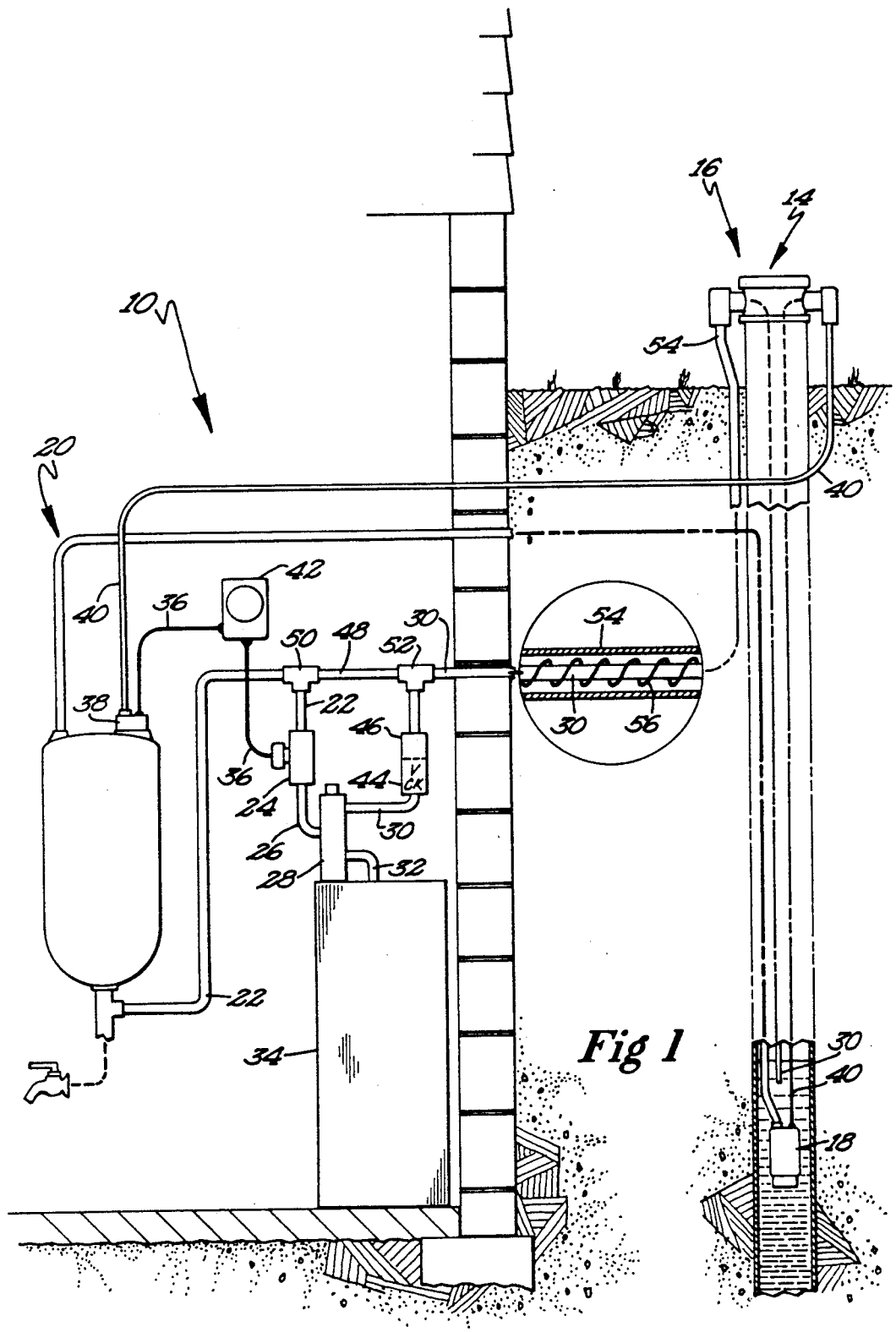
FIG. 1 shows a diagrammatic view of a chlorination system for a well water system according to the preferred teachings of the present invention.

The FIGURE is drawn for ease of explanation of the basic teachings of the present invention only; the extensions of the FIGURE with respect to number, position, relationship, and dimensions of the parts to form the preferred embodiment will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood. Furthermore, it should be understood that the terms used herein have reference only to the structure shown in the drawings as it would appear to a person viewing the drawings and are utilized only to facilitate describing the invention.

DESCRIPTION

A system for delivering a disinfectant is shown in the drawings according to the preferred teachings of the present invention and generally designated 10. System 10 provides disinfectant such as chlorine in liquid form to the well 14 of a water system 16, with the water system 16 including a pump 18 for drawing water from the well 14 and delivering it to a pressurized side 20 of system 16.

In the most preferred form, system 10 includes an input line 22 in fluid communication with the pressurized side 20 of system 16. Line 22 provides a water path under pressure to a solenoid valve 24 which in turn is in fluid communication with a drive line 26. Drive line 26 is in fluid communication with the input side of a venturi 28. The outlet side of the venturi 28 is in fluid communication with an output line 30. A suction line 32 is in fluid communication with the suction side of venturi 28 and is in fluid communication with a source 34 of disinfectant such as a tank of chlorine solution. Output line 30 extends from venturi 28 to and into the water level in well 14.

Solenoid valve 24 acts as a shutoff to selectively allow and prevent flow of water from pressurized side 20 of system 16 to venturi 28. In the most preferred form, solenoid valve 24 is opened to allow water flow through venturi 28 only when pump 18 is pumping water from well 14 for delivery to pressurized side 20, with the water flow through lines 22, 26, and 30, solenoid valve 24, and venturi 28 being at a substantially reduced rate than the rate that pump 18 delivers water from well 14 to pressurized side 20 of system 16. Specifically, in the preferred form, solenoid valve 24 is in electrical connection by electric lines 36 to a pressure switch 38 located on the pressurized side 20 of water system 16. In the most preferred form, pressure switch 38 is also in electrical connection to and controls pump 18 by electric lines 40. In the preferred form, a timer 42 is provided in electric lines 36 electrically intermediate pressure switch 38 and solenoid valve 24 to break electric connection between pressure switch 38 and solenoid valve 24 and interrupt flow through solenoid valve 24 based upon selected time intervals.

In the most preferred form, system 10 further includes a check valve 44 for preventing flow of fluid back through output line 30 and venturi 28 into source 34. Although check valve 44 is shown in output line 30, it can be also appreciated that check valve 44 may be located in suction line 32. Further, system 10 in the most preferred form includes a flow meter 46 which indicates the rate of flow and/or simply that flow is occurring to indicate proper operation of system 10 and specifically that the flow through the lines is not clogged. Although flow meter 46 is shown in output line 30, it can be appreciated that flow meter 46 may be located in suction line 32 to indicate flow through lines 22, 26, 30, and 32.

Although lines 22, 26, and 32, solenoid valve 24, venturi 28, and source 34 are often located in protected areas such as inside of a house in a residential application, outlet line 30 may extend to well 14 which may be located in a non-heated area and thus may be susceptible to frost. In environments where freezing may be possible, system 10 may include suitable provisions for preventing freezing of outlet line 30. In a first preferred form, a flow through line 48 may be provided for providing fluid communication from pressurized side 20 of system 16 through outlet line 30 to well 14 bypassing solenoid valve 24 and venturi 28 of system 10. Thus, as flowing water typically will not freeze, sufficient flow is allowed such that outlet line 30 is not susceptible to freezing but the flow is not at a rate which requires continual operation of pump 18. In the most preferred form, flow through line 48 is located intermediate a Tee joint 50 located in input line 22 and a Tee joint 52 located in output line 30.

Output line 30 may be typically buried underground from the protected area in which the remaining elements of system 10 are located to well 14. To avoid the necessity of requiring reburial in the event of the failure of output line 30, output line 30 may be located in a conduit 54 extending from the protected area to well 14. In a second preferred form, conductive heat elements 56 may be wrapped around output line 30 inside of conduit 54 and/or may be formed as part of conduit 54 to provide heat for preventing freezing.

Now that the basic construction of system 10 according to the preferred teachings of the present invention has been explained, the operation and subtle features of system 10 of the present invention can be set forth and appreciated. Specifically, when water is drawn from system 16 such as by opening a faucet on pressurized side 20, the resulting drop of pressure actuates pressure switch 38 in turn actuating pump 18 to pump water from well 14 into pressurized side 20. With system 10 according to the preferred teachings of the present invention, pressure switch 38 also actuates solenoid valve 24 providing flow from pressurized side 20 through lines 22 and 26 to venturi 28. Water flowing through venturi 28 draws solution from source 34 through line 32 into venturi 28 for mixing with the water passing through outlet line 30 to well 14. As the disinfectant is delivered to well 14 in liquid form, lodging problems of tablets are avoided. Further, with the outlet end of line 30 located below the water level in well 14, corrosion of metallic well components caused by exposure to disinfectant are also avoided.

It can then be appreciated that the size of lines 22, 26, 30, and 32, valve 24, and venturi 28 can be designed to affect the desired rate of disinfectant supplied. However, it can be appreciated that the desired rate of disinfectant will vary from well to well and from time to time for the same well. For example, well 14 that is initially being chlorinated requires a greater amount of disinfectant than the same well after being chlorinated for a period of time. In the preferred form, the desired rate of disinfectant supplied may be easily adjusted by the well owner by utilizing timer 42. Specifically, typically by simply turning a knob on timer 42, the well owner controls the frequency that system 10 according to the teachings of the present invention is activated. Particularly, by adjusting timer 42, opening of solenoid valve 24 may be varied to occur only at selected times of operation of pump 18 such that disinfectant is supplied by system 10 according to the teachings of the present invention only part of the time. Thus, problems in adjustment in prior disinfectant delivery systems are also avoided.

Further, system 10 according to the teachings of the present invention relies upon the water pressure of system 16 to deliver the disinfectant and specifically does not require or utilize pumps, motors, or the like. Elimination of such components greatly reduces the cost of system 10 according to the teachings of the present invention. Further, the components of system 10 according to the teachings of the present invention are less susceptible to corrosion, wear, or failure than pumps, motors, or the like such that maintenance and repair requirements of system 10 are greatly reduced over prior disinfectant delivery systems. Further, the delivery of the disinfectant in liquid form to well 14 by system 10 allows all water drawn by pump 18 from well 14 to be disinfected and eliminates other problems associated with injecting disinfectant into the high pressure side of the water system.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. Apparatus for delivering disinfectant in a liquid form to a well of a water system, with the water system further including a member for drawing water from the well and delivering the water to a pressurized side of the water system, comprising, in combination: a venturi including an inlet side, an outlet side, and a suction side; a source of liquid disinfectant; means for providing liquid communication from the suction side of the venturi with the source of liquid disinfectant; means for providing fluid communication from the outlet side of the venturi to the well; and means for providing fluid communication from the pressurized side of the water system to the inlet side of the venturi, with the means for providing fluid communication from the pressurized side of the water system to the inlet side of the venturi including means for selectively allowing flow of water from the pressurized side of the water system to the inlet side of the venturi only while water is being drawn from the well and delivered to the pressurized side of the water system, with the flow of water through the venturi drawing liquid disinfectant from the source of liquid disinfectant for mixing with the water passing through the means for providing fluid communication from the outlet side of the venturi to the well.

2. The apparatus of claim 1 wherein the selectively allowing means comprises a solenoid valve.

3. The apparatus of claim 2 wherein the water system further includes a pressure switch on the pressurized side, with the pressure switch actuating the water drawing member and the solenoid valve.

4. The apparatus of claim 3 wherein the selectively allowing means further comprises means for allowing flow of water only during selected times that water is being drawn from the well and delivered to the pressurized side of the water system for adjusting the rate that disinfectant is delivered to the well.

5. The apparatus of claim 4 wherein the means for allowing flow only during selected times comprises a timer located electrically intermediate the pressure switch and the solenoid valve.

6. The apparatus of claim 1 wherein the selectively allowing means further comprises means for allowing flow of water only during selected times that water is being drawn from the well and delivered to the pressurized side of the water system.

7. The apparatus of claim 6 wherein the means for allowing flow only during selected times comprises a timer for controlling the selectively allowing means.

8. The apparatus of claim 1 further comprising, in combination: means for preventing backflow of fluid through the means for providing fluid communication from the suction side of the venturi with the source of disinfectant.

9. The apparatus of claim 8 wherein the back flow preventing means comprises a check valve located in the means for providing fluid communication from the outlet side of the venturi to the well.

10. The apparatus of claim 1 further comprising, in combination: means for preventing the means for providing fluid communication from the outlet side of the venturi to the well from freezing.

11. The apparatus of claim 10 wherein the freezing preventing means comprises, in combination: means for providing fluid communication from the means for providing fluid communication from the pressurized side of the water system to the inlet side of the venturi to the means for providing fluid communication from the outlet side of the venturi to the well and by-passing the selectively allowing means and the venturi.

12. The apparatus of claim 10 further comprising, in combination: a conduit extending from the well and having a size for slideable receipt of the means for providing fluid communication from the outlet side of the venturi to the well; and wherein the freezing preventing means comprises means wrapped around the means for providing fluid communication from the outlet side of the venturi to the well for conducting heat to the means for providing fluid communication from the outlet side of the venturi to the well.

13. The apparatus of claim 1 further comprising, in combination: a conduit extending from the well and having a size for slideable receipt of the means for providing fluid communication from the outlet side of the venturi to the well.

14. The apparatus of claim 1 wherein the means for providing fluid communication from the outlet side of the venturi to the well extends below the water level in the well.

15. Method for delivering disinfectant in a liquid form to a well of a water system, with the water system including a pressurized side, comprising the steps of:
   (a) providing a source of liquid disinfectant;
   (b) drawing water from the well and delivering the water to the pressurized side of the water system;
   (c) providing a flow of water from the pressurized side of the water system to the well while water is being drawn and delivered to the pressurized side of the water system; and
   (d) passing the flow of water intermediate the pressurized side and the well through a venturi, with the venturi withdrawing liquid disinfectant from the source of liquid disinfectant and mixing the liquid disinfectant with the flow of water before passage to the well.

16. The method of claim 15 wherein the step of providing a flow of water comprises the step of providing a flow of water from the pressurized side of the water system to the well only during selected times that water is being drawn and delivered to the pressurized side of the water system.

17. The method of claim 15 further comprising the step of preventing backflow of water and disinfectant into the source of disinfectant when water is not being drawn from the well.

18. The method of claim 15 further comprising the step of providing a flow of water from the pressurized side of the water system to the well bypassing the venturi to prevent freezing adjacent the well.

19. Apparatus for delivering a fluid to a well of a water system, with the water system further including a member for drawing water from the well and delivering the water to a pressurized side of the water system, comprising, in combination: a venturi including an inlet side, an outlet side, and a suction side; a source of fluid; means for providing fluid communication from the suction side of the venturi with the source of fluid; means for providing fluid communication from the outlet side of the venturi to the well; means for providing fluid communication from the pressurized side of the water system to the inlet side of the venturi, with the means for providing fluid communication from the pressurized side of the water system to the inlet side of the venturi including means for selectively allowing flow of water from the pressurized side of the water system to the inlet side of the venturi only while water is being drawn from the well and delivered to the pressurized side of the water system; and means for providing fluid communication from the pressurized side of the water system to the means for providing fluid communication from the outlet side of the venturi to the well bypassing the selectively allowing means.

20. The apparatus of claim 19 wherein the means for providing fluid communication from the pressurized side of the water system to the means for providing fluid communication from the outlet side of the venturi to the well bypasses the venturi.

* * * * *